United States Patent
Chen et al.

(10) Patent No.: US 10,046,314 B2
(45) Date of Patent: Aug. 14, 2018

(54) CATALYST FOR AMMONIA SYNTHESIS AND AMMONIA DECOMPOSITION

(71) Applicant: DALIAN INSTITUTE OF CHEMICAL PHYSICS, CHINESE ACADEMY OF SCIENCES, Dalian, Liaoning (CN)

(72) Inventors: Ping Chen, Liaoning (CN); Jianping Guo, Liaoning (CN); Peikun Wang, Liaoning (CN); Zhitao Xiong, Liaoning (CN); Daqiang Hu, Liaoning (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 0 days.

(21) Appl. No.: 15/037,630

(22) PCT Filed: Dec. 20, 2013

(86) PCT No.: PCT/CN2013/090133
§ 371 (c)(1),
(2) Date: May 18, 2016

(87) PCT Pub. No.: WO2016/085623
PCT Pub. Date: Jun. 18, 2015

(65) Prior Publication Data
US 2016/0271595 A1    Sep. 22, 2016

(30) Foreign Application Priority Data

Dec. 10, 2013  (CN) .......................... 2013 1 0670541

(51) Int. Cl.
*B01J 27/24*    (2006.01)
*C01B 3/02*    (2006.01)
(Continued)

(52) U.S. Cl.
CPC ............... *B01J 27/24* (2013.01); *B01J 31/12* (2013.01); *B01J 31/18* (2013.01); *B01J 35/0006* (2013.01);
(Continued)

(58) Field of Classification Search
CPC ....................................................... B01J 27/24
See application file for complete search history.

(56) References Cited

U.S. PATENT DOCUMENTS 4,235,749 A   11/1980  Gens
6,479,027 B1* 11/2002 Jacobsen ................ B01J 23/462
                                                        423/362

(Continued)

FOREIGN PATENT DOCUMENTS

| CN | 1528665 A | 9/2004 |
| JP | 2011213534 A | 10/2011 |
| WO | WO2015/044691 | * 4/2015 |

OTHER PUBLICATIONS

Heterogeneous catalysis with metal nitrides. J.S.J. Hargreaves Coordination Chemistry Reviews V. 257, pp. 2015-2031 (Year: 2012).*

(Continued)

*Primary Examiner* — Douglas B Call
(74) *Attorney, Agent, or Firm* — Novick, Kim & Lee, PLLC; Allen Xue

(57) ABSTRACT

The present invention relates to a catalyst for ammonia synthesis and ammonia decomposition. The catalyst includes a nitrogen-containing compound of a main group element and a related support and an additive. The present invention is a novel catalytic material, which exhibits good catalytic activity in ammonia synthesis and ammonia decomposition reactions.

9 Claims, 3 Drawing Sheets

(51) Int. Cl.

| | |
|---|---|
| *C01C 1/04* | (2006.01) |
| *B01J 35/00* | (2006.01) |
| *B01J 31/12* | (2006.01) |
| *B01J 31/18* | (2006.01) |
| *C01C 1/02* | (2006.01) |
| *C01B 3/04* | (2006.01) |
| *C01B 3/06* | (2006.01) |

(52) U.S. Cl.
CPC .............. *C01B 3/025* (2013.01); *C01B 3/047* (2013.01); *C01B 3/065* (2013.01); *C01C 1/026* (2013.01); *C01C 1/0411* (2013.01); *Y02E 60/362* (2013.01); *Y02E 60/364* (2013.01); *Y02P 20/52* (2015.11)

(56) References Cited

U.S. PATENT DOCUMENTS

| | | | | |
|---|---|---|---|---|
| 2009/0121184 A1* | 5/2009 | Fujii | ........................ | C01B 3/065 252/188.25 |
| 2010/0111823 A1* | 5/2010 | Uzhinsky | .................. | C01B 3/04 423/648.1 |
| 2011/0176988 A1* | 7/2011 | Okamura | ........... | B01D 53/8634 423/409 |
| 2016/0289068 A1* | 10/2016 | Jones | ...................... | C01B 3/047 |

OTHER PUBLICATIONS

Claus J. H. Jacobsen, "Novel class of ammonia synthesis catalysts", The Royal Society of Chemistry, 2000, pp. 1057-1058.

Ryoichi Kojima et al., "Cobalt Molybdenum Bimetallic Nitride Catalysts for Ammonia Synthesis", Chemistry Letters, vol. 29 (2000) No. 5, pp. 514-515.

Changhai Liang et al., "Catalytic Decomposition of Ammonia over Nitrided MoNx/r-Al2O3 and NiMoNy/r-Al2O3 Catalysts", Ind. Eng. Chem. Res., 2000, 39 (10), pp. 3694-3697.

Ping Chen et al., "Interaction of hydrogen with metal nitrides and imides", Letters to nature, vol. 420, Nov. 21, 2002, pp. 302-304.

Robert Schlogl, "Catalytic Synthesis of Ammonia—A 'Never-Ending Story'?", Angew. Chem. Int. Ed. 2003, 42, pp. 2004-2008.

Yasuo Ohtsuka et al., "Decomposition of ammonia with iron and calcium catalysts supported on coal chars", FUEL, 83, 2004, pp. 685-692.

George Thomas et al., "Potential Roles of Ammonia in a Hydrogen Economy, A Study of Issues Related to the Use Ammonia for On-Board Vehicular Hydrogen Storage", U.S. Dept. of Energy, pp. 1-23, Feb. 2006.

Wucan Liu et al., "The Research on the Catalyst of Load Transition Metal Nitrides with two Components", Petrochemical Technology, vol. 33, Dec. 31, 2004, pp. 1390-1392.

* cited by examiner

CATALYST FOR AMMONIA SYNTHESIS AND AMMONIA DECOMPOSITION

TECHNICAL FIELD

The present invention relates to a catalyst technology, and particularly provides a catalyst for ammonia synthesis and ammonia decomposition and applications thereof in ammonia synthesis and ammonia decomposition reactions.

BACKGROUND

Ammonia is a basic raw material for producing such important chemical products as fertilizers, nitric acid, plastics, etc., and at the same time is a hydrogen source carrier with a potential application prospect; thus the ammonia synthesis and decomposition have a very important significance in industry. The direct catalytic conversion of $N_2$ and $H_2$ is a main means of industrial ammonia synthesis. Because the reaction condition of the ammonia synthesis is harsh and the requirement for a device is very high, the energy consumption is very high, and the annually consumed energy is 1% of the total annual energy consumption in the world. Recently, the catalysts widely used for ammonia synthesis and ammonia decomposition in industry are respectively transition metal catalysts such as Fe-based catalyst, Ru-based catalyst, Ni-based catalyst, etc. However, for decades, the efficiency of ammonia synthesis has not been improved and increased significantly, and the reaction condition still needs high temperature and high pressure. For an ammonia decomposition reaction, the low-cost Ni-based catalyst, however, shows low activity. Therefore, the development of a novel ammonia synthesis and ammonia decomposition catalyst system with low-temperature, low-pressure activity and high-efficiency is a very important research topic at present. Without the limitations of the Fe and Ru-based catalyst, the research and development of catalysts of other components by referring to an existing basic theory and technology is an effective strategy of developing a new generation of ammonia synthesis and ammonia decomposition catalyst.

As for a non-Fe(Ru)-based catalyst of ammonia synthesis and decomposition, some progress has been made in recent years. Aika and Jacobsen et al. respectively reported that a transition metal nitride alloy shows good catalytic activity in ammonia synthesis. Under lower temperature and pressure, the activity of a Cs-promoted $Co_3Mo_3N$ catalyst is superior to that of an industrially widely used multiply-promoted fused iron catalyst, and under certain condition, even is superior to that of the Ru-based catalyst [R. Kojima, K. Aika, Chem. Lett., 2000, 514-515; C. J. H. Jacobsen, Chem. Commu., 2000, 1057-1058.]. C. Li et al. used the transition metal nitride alloy supported on aluminium oxide in the ammonia decomposition reaction, and also obtained better catalytic activity [C. H. Liang, W. Z. Li, Z. B. Wei, Q. Xin, C. Li, Ind. Eng. Chem. Res., 2000, 39: 3694-3697.].

Ohtsuka et al. used calcium oxide supported on carbon-based materials in the decomposition reaction of ammonia of a low concentration (2000 ppm), and found that the catalyst shows certain catalytic ammonia decomposition activity above the temperature of 700° C. [Y. Ohtsuka, C. Xu, D. Kong, N. Tsubouchi, Fuel, 2004, 83: 685-692.].

In conclusion, the non-Fe(Ru)-based ammonia synthesis and ammonia decomposition catalyst has made some progress, but also is unable to achieve industrialization. Further study shall be made on how to regulate the catalyst composition and structure to enhance the activity and stability of the catalyst and reduce catalyst cost.

SUMMARY $NH_3$ can be produced upon heating an alkali metal amide in a stream of hydrogen, and a reaction formula is as follows:

$$LiNH_2 + H_2 = LiH + NH_3$$

however, in such a process, $LiNH_2$ is a reactant rather than a catalyst. In 2002, the inventor reported that $Li_2NH$ and $Li_3N$ could conduct a reversible hydrogen absorption-desorption reaction at moderate temperatures, and hydrogenated products are $LiNH_2$ and LiH. Further experimental results showed that the $LiNH_2$ can be decomposed to emit $NH_3$ in the temperature range of 200 to 500° C. with the peak temperature at about 370° C. An interesting finding is that when the reaction temperature is higher than 400° C., a small amount of $N_2$ and $H_2$ are detected in the gaseous product, as shown in FIG. 1. Because the conversion rate of gaseous self-decomposition of $NH_3$ is very low at temperatures lower than 500° C., it is likely that $LiNH_2$ or $Li_2NH$ can exhibit catalytic effect in the further decomposition of ammonia of the gaseous product.

To demonstrate this effect, we firstly adopt a method of temperature programming reaction to investigate the behavior of $Li_2NH$ in a diluted ammonia (5% $NH_3/Ar$). As shown in FIG. 2, $N_2$ and $H_2$ are produced at a temperature of 450° C. and gradually enhanced as the temperature increases, which evidence that the decomposition reaction of ammonia occurs in such a process. XRD results of the reacted sample show that the sample is still $Li_2NH$, which further confirms that $Li_2NH$ has the catalytic effect in the ammonia decomposition.

The further study shows that nitrogen or/hydrogen-containing compounds of main group elements such as Na, K, Cs, Be, Mg, Ca, Sr, Ba, Al, etc. also have the similar catalytic activities. The nitrogen or/and hydrogen-containing compounds include mono-component or multi-component nitride, amide, imino compound, nitrogen oxide, nitride-hydride and hydride or a mixture of two or more, etc. The basic composition thereof is $M_xN_yH_{m(3y-nx)}$, where M is one or more than two of an IA, IIA, IIIA group element, n (can be 1, 2 and 3) is the valence of M, and m (can be 1 and −1) is the valence of H; when m=1, the formula is $M_xN_yH_{3y-nx}$, x=1-3, y=1-3; and when m=−1, the formula is $M_xN_yH_{nx-3y}$, x=1-4, y=0-1.

The nitrogen or/and hydrogen-containing compounds of main group elements can be loaded on certain supports. The supports can be one of $Li_2O$, $Na_2O$, $K_2O$, MgO, CaO, SrO, BaO, $SiO_2$, $Al_2O_3$, BN, $Si_3N_4$, $Mg_3N_2$, $Ca_3N_2$, AlN, molecular sieve, carbon material and Metal-Organic Frameworks (MOF) or a combination of more than two. The mass ratio of the catalyst to the carrier is in a preferred range from 200:1 to 1:100.

Metal nitrides can be added to the nitrogen or/and hydrogen-containing compounds of the main group elements. The metal nitrides are IVB, VB, VIB, VIIB or VIIIB elements, such as one or more than two of nitrides of Ti, Zr, V, Nb, Ta, Cr, Mo, W, Mn, Fe, Co, etc. The mass ratio of the catalyst to the metal nitride is in the preferred range from 200:1 to 1:100.

Metal alloys can be added to the nitrogen or/and hydrogen-containing compounds of the main group elements. The metal alloys are IVB, VB, VIB, VIIB or VIIIB elements, such as alloy higher than binary or ternary alloy formed by synthesis of two or three of Ti, Zr, Cr, Mo, W, Mn, Fe, Ru, Co, Rh, Ir, Ni, Pd and Pt, or the IVB, VB, VIB, VIIB or VIIIB elements, such as alloy higher than binary or ternary alloy formed by one or more than two of Ti, Zr, Cr, Mo, W, Mn, Fe, Ru, Co, Rh, Ir, Ni, Pd and Pt and C and/or B. The mass ratio of the catalyst to the metal alloy is in the preferred range from 200:1 to 1:100.

In the ammonia decomposition reaction, by adopting the catalyst provided in the present invention, the relatively ideal effect can be obtained: a $Fe_2N/LiNH_2$ (molar ratio is 0.5:3) catalyst exhibits approximate activity compared with a 5 wt % Ru/CNTs catalyst prepared by a conventional impregnation method. In the ammonia synthesis reaction, the ammonia synthesis reaction rate of LiH in $N_2/H_2$ mixture ($N_2:H_2$=1:3) can reach 95 umol $g_{cat}^{-1}$ $h^{-1}$ under reaction condition of 400° C. at constant pressure.

DETAILED DESCRIPTION

To further describe the present invention, the following specific embodiments are listed, but do not limit the invention scope defined by all appended claims.

Embodiment 1

Figure 1:
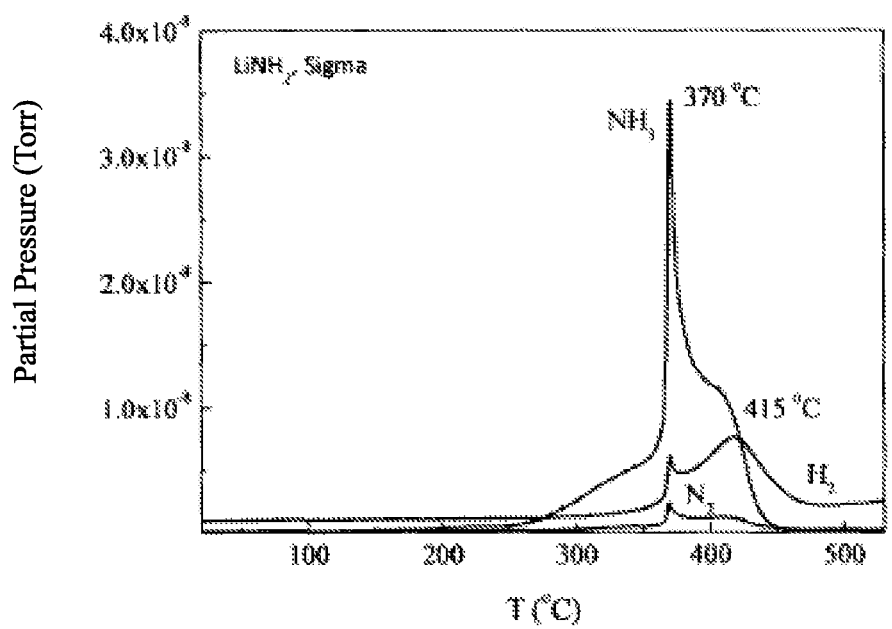
FIG. 1 shows the temperature programmed desorption of $LiNH_2$ (Ar-TPD).
Figure 2:
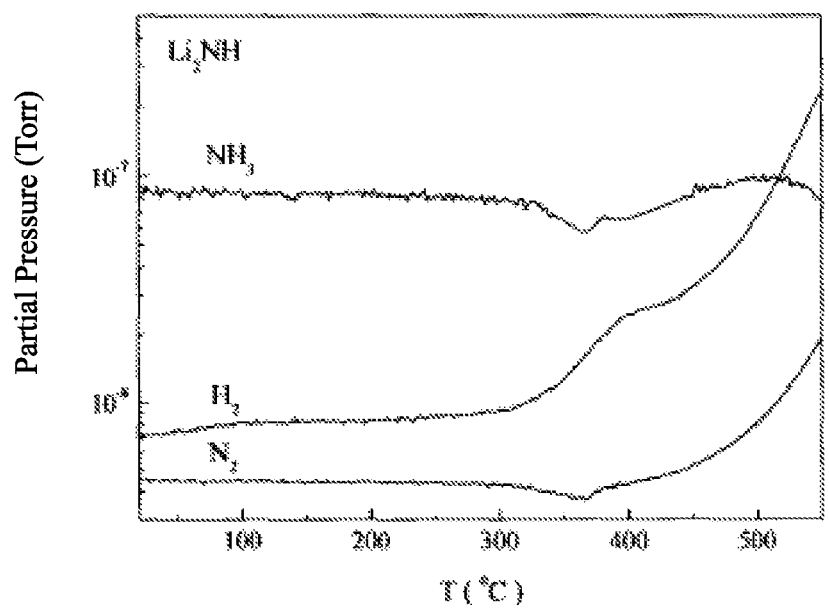
FIG. 2 shows the temperature programmed reaction of $Li_2NH$ in 5% $NH_3/Ar$ ($NH_3$-TPR).
Figure 3:
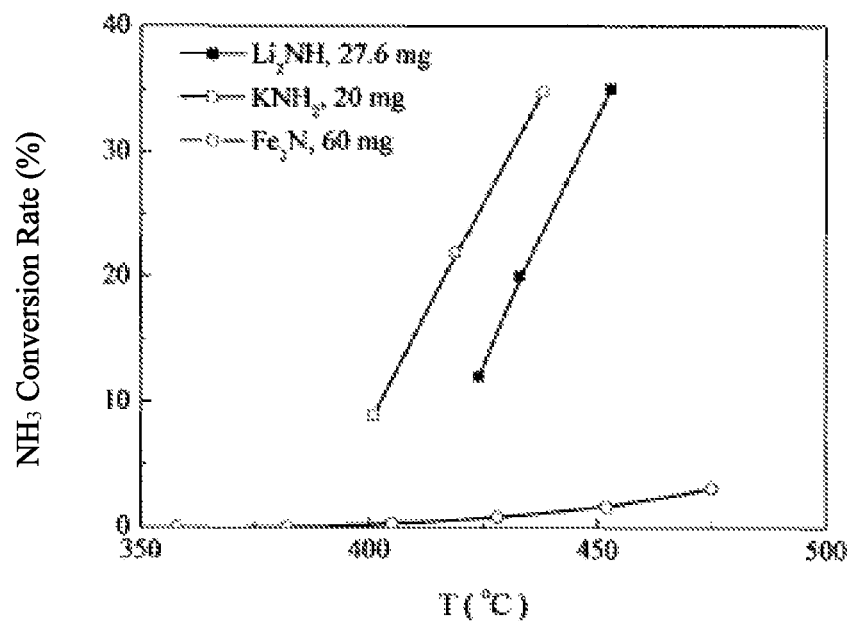
FIG. 3 shows the activities of $Li_2NH$, $KNH_2$ and $Fe_2N$ in the 5% $NH_3/Ar$.

In an argon glovebox, $Li_2NH$ of 0.0300 g is accurately taken in a fixed bed stainless steel reactor. The sample is heated to 400° C. in argon atmosphere, and the argon flow rate is 30 mL/min. After 20 min, 5% $NH_3/Ar$ mixture is introduced, the reactant flow rate is controlled between 1.8 L/h and 3.6 L/h, and after 30 min, the sampling analysis is conducted. The measurement results are shown in FIG. 3. The $NH_3$ conversion rate increases approximately linearly as the temperature increases, and the $NH_3$ conversion rate can reach 35% at 450° C.

Embodiment 2

In the argon glovebox, $KNH_2$ of 0.0300 g is accurately taken in the fixed bed stainless steel reactor. The sample is heated to 400° C. in argon atmosphere, after 20 min, 5% $NH_3/Ar$ mixture is introduced, the reactant flow rate is controlled between 1.8 L/h and 3.6 L/h, and after 30 min, the sampling analysis is conducted. The measurement results are shown in FIG. 3. The ammonia conversion rate increases approximately linearly as the temperature increases. At the same reaction temperature, the activity thereof is a little more than that of the $Li_2NH$, and the $NH_3$ conversion rate can reach 35% at 440° C.

Embodiment 3

In the argon glovebox, $Fe_2N$ of 1.0000 g and $LiNH_2$ of 0.7300 g are accurately taken in a homemade stainless steel ball mill tank. After the ball mill tank is sealed, the sample $Fe_2N/LiNH_2$ (molar ratio is 0.5:2) is prepared by ball-milling $Fe_2N$ and $LiNH_2$ under ball mill condition of 200 rpm in a planetary ball mill (Fischt PM400) for 5 h.

Figure 4:
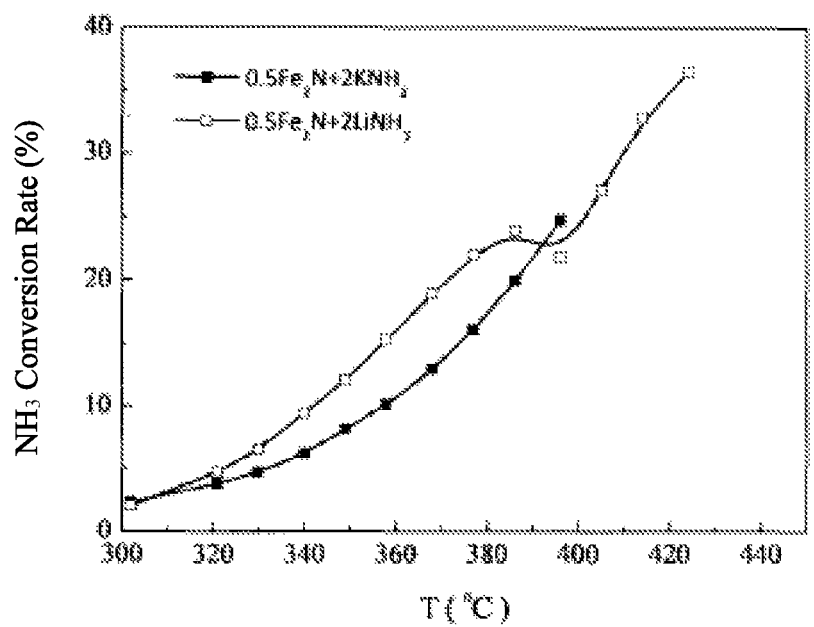
FIG. 4 shows the reaction activities of $Fe_2N/LiNH_2$ (molar ratio is 0.5:2) and $Fe_2N/KNH_2$ (molar ratio is 0.5:2) in the 5% $NH_3/Ar$.

In the argon glovebox, $Fe_2N/LiNH_2$ (molar ratio is 0.5:2) of 0.0350 g is accurately taken in the fixed bed stainless steel reactor. The sample is heated to a desired temperature in reaction atmosphere (5% $NH_3/Ar$ mixture), the reactant flow rate is controlled between 1.8 L/h and 3.6 L/h, and after 30 min, the sampling analysis is conducted. The measurement results are shown in FIG. 4. The $NH_3$ conversion rate gradually increases as the temperature increases, and the $NH_3$ conversion rate can reach 22% at 380° C.; when the temperature is higher than 380° C., the catalyst activity decreases; and when the temperature is higher than 400° C., the $NH_3$ conversion rate increases gradually as the temperature increases.

Embodiment 4

In the argon glovebox, $Fe_2N$ of 1.0000 g and $KNH_2$ of 0.7300 g are accurately taken in a homemade stainless steel ball mill tank. After the ball mill tank is sealed, the sample $Fe_2N/KNH_2$ (molar ratio is 0.5:2) is prepared by ball-milling $Fe_2N$ and $KNH_2$ under ball mill condition of 200 rpm in the planetary ball mill (Fischt PM400) for 5 h.

In the argon glovebox, $Fe_2N/LiNH_2$ (molar ratio is 0.5:2) of 0.0350 g is accurately taken in the fixed bed stainless steel reactor. The sample is heated to a desired temperature in reaction atmosphere (5% $NH_3/Ar$ mixture), the reactant flow rate is controlled between 1.8 L/h and 3.6 L/h, and after 30 min, the sampling analysis is conducted. The measurement results are shown in FIG. 4. The $NH_3$ conversion rate increases gradually as the temperature increases during the temperature range of 300 to 400° C. The $NH_3$ conversion rate can reach 16% at 380° C., which is lower than that of the sample $Fe_2N/LiNH_2$ (molar ratio is 0.5:2).

Embodiment 5

Figure 5:
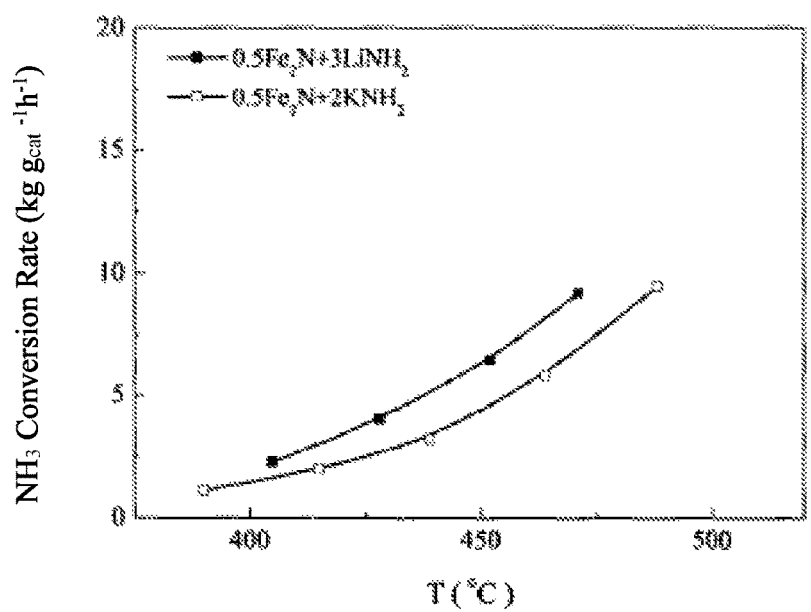
FIG. 5 shows the reaction activities of $Fe_2N/LiNH_2$ (molar ratio is 0.5:3) and $Fe_2N/KNH_2$ (molar ratio is 0.5:2) in pure ammonia.

In the argon glovebox, $Fe_2N/LiNH_2$ (molar ratio is 0.5:3) of 0.0400 g is accurately taken in the fixed bed stainless steel reactor. The sample is heated to the desired reaction temperature in pure ammonia atmosphere, the reactant flow rate is controlled at 2.4 L/h, and after 30 min, the sampling analysis is conducted. The measurement results are shown in FIG. 5. The $NH_3$ conversion rate increases as the temperature increases during the temperature range of 400 to 475° C., and the $NH_3$ conversion rate is measured to be 9.2 kg $NH_3$ $g_{cat}^{-1}$ $h^{-1}$ at 470° C.

Embodiment 6

In the argon glovebox, $Fe_2N/KNH_2$ (molar ratio is 0.5:2) of 0.0400 g is accurately taken in the fixed bed stainless steel reactor. The sample is heated to the desired reaction temperature in pure ammonia atmosphere, the reactant flow rate is controlled at 2.4 L/h, and after 30 min, the sampling analysis is conducted. The measurement results are shown in FIG. 5. The $NH_3$ conversion rate increases as the temperature increases during the temperature range of 300 to 400° C. The $NH_3$ conversion rate is measured to be 6.9 kg $NH_3$ $g_{cat}^{-1}$ $h^{-1}$ at 470° C., which is slower than that of the sample $Fe_2N/LiNH_2$ (molar ratio is 0.5:3).

Embodiment 7

In the argon glovebox, a ball-milled LiH sample of 0.0300 g is accurately taken in a fixed bed stainless steel high-pressure reactor. The sample is heated to 400° C. in $N_2/H_2$ mixture (volume ratio of $N_2$ to $H_2$ is 1:3), the total pressure is 1 atm, the reactant flow rate is 1.8 L/h, and the $NH_3$ synthesis rate is detected by using the conventional conductivity method. The $NH_3$ synthesis rate is measured to be 95 umol $g_{cat}^{-1}$ $h^{-1}$ under reaction condition.

Embodiment 8

In the argon glovebox, a Fe/KH sample of 0.0300 g prepared by a ball-milling method is accurately taken in the fixed bed stainless steel high-pressure reactor. The sample is heated to 400° C. in $N_2/H_2$ mixture (volume ratio of $N_2$ to $H_2$ is 1:3), the total pressure is 1 atm, the reactant flow rate is 1.8 L/h, and the $NH_3$ synthesis rate is detected by using the conventional conductivity method. The $NH_3$ synthesis rate is measured to be 120 umol $g_{cat}^{-1}$ $h^{-1}$ under reaction condition.

Embodiment 9

In the argon glovebox, a 5 wt % Ru/LiH sample of 0.0560 g homemade by an impregnation method is accurately taken in the fixed bed stainless steel high-pressure reactor. The sample is heated to 400° C. in $N_2/H_2$ mixture (volume ratio of $N_2$ to $H_2$ is 1:3), the total pressure is 10 atm, the reactant flow rate is 2.4 L/h, and the $NH_3$ synthesis rate is detected by using the conventional conductivity method. The $NH_3$ synthesis rate is measured to be 75 umol $g_{cat}^{-1}$ $h^{-1}$ under reaction condition.

Embodiment 10

In the argon glovebox, a $KNH_2$-promoted 5 wt % Ru/LiH sample of 0.1390 g homemade by the impregnation method is accurately taken in the fixed bed stainless steel high-pressure reactor. The sample is heated to 340° C. in $N_2/H_2$ mixture (volume ratio of $N_2$ to $H_2$ is 1:3), the total pressure is 1 atm, the reactant flow rate is 2.4 L/h, and the $NH_3$ synthesis rate is detected by using the conventional conductivity method. The $NH_3$ synthesis rate is measured to be 5010 umol $g_{cat}^{-1}$ $h^{-1}$ under reaction condition.

We claim:

1. A catalyst for ammonia synthesis, comprising:
at least one compound of a main group element, wherein the at least one compound of the main group element is a hydride of the main group element;
one or more selected from the group consisting of transition metal nitrides and transition metal alloys; and
a support.

2. The catalyst according to claim 1, wherein the at least one compound of the main group element is represented by formula $MH_x$, wherein M is an IA, IIA, or IIIA group element, x is 1, 2, or 3 and equals a valence of M.

3. The catalyst according to claim 1, wherein the main group element is one selected from the group consisting of Li, Na, K, Cs, Mg, Ca, Ba, Al, and a mixture thereof.

4. The catalyst according to claim 1, wherein the support is one selected from the group consisting of $Li_2O$, MgO, CaO, SrO, BaO, $Al_2O_3$, BN, $Si_3N_4$, $Mg_3N_2$, $Ca_3N_2$, AlN, molecular sieve, carbon material, Metal-organic Frameworks (MOF), and a mixture thereof.

5. The catalyst according to claim 1, wherein the transition metal nitrides are nitrides of Ti, Zr, V, Nb, Ta, Cr, Mo, W, Mn, Fe, Ru, and Co.

6. The catalyst according to claim 1, wherein the transition metal alloys are selected from the group consisting of binary or ternary alloys comprising two or three of Ti, Zr, V, Nb, Ta, Cr, Mo, W, Mn, Fe, Ru, Co, Rh, Ir, Ni, Pd and Pt, or alloy comprising C, B, and one or more element selected from the group consisting of Ti, Zr, Cr, Mo, W, Mn, Fe, Ru, Co, Rh, Ir, Ni, Pd, and Pt.

7. The catalyst according to claim 1, wherein a mass ratio of the one or more selected from the group consisting of compounds of a main group element to the one or more selected from the group consisting of transition metal nitrides or transition metal alloys or the support ranges from 200:1 to 1:100.

8. The catalyst of claim 1, comprises $LiNH_2$, $Li_2NH$, $KNH_2$, $Fe_2N$—$KNH_2$, $Fe_2N$—$LiNH_2$, LiH, Fe—KH, Ru—LiH, or $KNH_2$—Ru/LiH.

9. A method for ammonia synthesis, comprising:
contacting a gas mixture comprising $N_2$ and $H_2$ with the catalyst of claim 1 at a temperature ranging from 300° C. to 550° C.

* * * * *